United States Patent [19]

Dubois et al.

[11] 4,334,054
[45] Jun. 8, 1982

[54] FILMS OF POLYPHENYLENE OXIDES

[75] Inventors: Jacques E. Dubois, Paris; Minh-Chau Pham, Le Vesinet; Pierre C. Lacaze, Paris, all of France

[73] Assignee: Agence Nationale de Valorisation de la Recherche (ANVAR), Neuilly-Sur-Seine, France

[21] Appl. No.: 912,740

[22] Filed: Jun. 5, 1978

[30] Foreign Application Priority Data

Jun. 10, 1977 [FR] France ................................ 77 17851

[51] Int. Cl.³ ............................................. C08G 65/44
[52] U.S. Cl. .................................. 528/210; 204/14 N; 204/59 R; 428/411; 428/457
[58] Field of Search ................ 528/210; 428/411, 457; 204/14 N, 59 R

[56] References Cited

U.S. PATENT DOCUMENTS

| | | | |
|---|---|---|---|
| 2,961,384 | 11/1960 | McKinney et al. | 204/14 N |
| 3,226,361 | 12/1965 | Borman | 528/210 |
| 3,573,257 | 3/1971 | Nakashio et al. | 528/210 |
| 3,681,285 | 8/1972 | Naarmann et al. | 528/210 |
| 4,129,555 | 12/1978 | White | 528/210 |

Primary Examiner—Maurice J. Welsh
Attorney, Agent, or Firm—Wegner & Bretschneider

[57] ABSTRACT

The polymer films of the invention contain reactive groups and are obtained from phenols of the formula

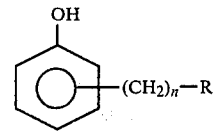

in which
R denotes an acyl group with 1 to 7 carbon atoms, a hydroxy, carboxy, alkoxycarbonyl, amino, alkylamino or phenylamino group, and
n is an integer, which may be 0 in the case where R is an acyl group.

The films are prepared by electrolytic polymerisation on metallic surfaces and can be used to graft various materials reacting therewith, as intermediate layers.

32 Claims, No Drawings

FILMS OF POLYPHENYLENE OXIDES

The object of the present invention are films of polyphenylene oxides containing reactive groups and their preparation by an electrochemical method.

The invention more particularly relates to new polymers containing reactive chemical groups and which are prepared electrolytically and deposited in the form of films on metallic surfaces.

The polymerisation by electrolytic oxidation of phenol and some of its derivatives as well as the deposition of the polymer films obtained on metallic surfaces are known from U.S. Pat. No. 2,961,384. Furthermore, the preparation of polymer films from phenols disubstituted in the 2- and 6-positions and their electrolytic deposition on metals such as iron, copper and nickel are described in French Pat. No. 74.16158. These polymer films are extremely adherent, hydrophobic and uniform, and are used to protect metals.

Of course, the various polymers thus obtained do not contain reactive groups. Some workers have however successfully introduced reactive chemical groups into the polymer films by specially developed physical methods. In such a case, carbonyl groups have been introduced in the surface of the polymer (polypropylene) by the action of oxygen after irradiating the surface with UV light or electrons (K. KATO, J. of Applied Polymer Science, 19 (1975), p. 951-957). $NH_2$ groups have also been introduced by the electrical discharge process (J. R. Hollahan et al. J. Appl. Polym. Science, 13, 1969), p. 807). The reactive groups thus introduced into the films are distributed at random and moreover the films tend to age on account of the large number of trapped radical species (M. MILLARD, Synthesis of Organic Polymer Films in Plasmas, Chap. V, p. 177, in Technics and Application of Plasma Chemistry. J. H. HOLLAHAN and A. T. BELL, 1974, J. WILEY).

The object of the present invention is to synthesize reactive polymers by the afore-mentioned electrolytic polymerisation process, in which the said polymers are characterised by the presence in each link of their chain of functional groups capable of reacting according to a specific chemical reaction.

The polymer films of the invention are obtained from phenols of the formula

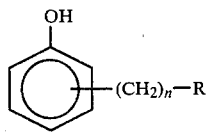

in which
R denotes an acyl group with 1 1 to 7 carbon atoms, a hydroxy, carboxy, alkoxycarbonyl, amino, alkylamino or phenylamino group, and
n is an integer, which may be 0 in the case where R is an acyl group.

The invention more particularly concerns the polymer films obtained from monomers of formula (I) in which $-(CH_2)_n-R$ represents a formyl, acetyl, propionyl, benzoyl, 3-hydroxybutyl, hydroxymethyl, carboxymethyl, aminoethyl or anilinomethyl group.

The polymers of the invention thus contain a carbonyl, hydroxy, carboxy or amino group as reactive functional group.

According to the invention the polymer films are prepared by anodic oxidation of the monomer phenols (I) in an alcoholic and strongly basic electrolytic bath. The polymers formed are deposited directly on the anode, which may, if desired, be a conducting substrate or one that has been made electrically conducting, and which it is desired to coat with a thin layer of polymer.

The alcohols that can be used for the bath are lower alcohols such as methanol, ethanol, propanol or isopropanol, or a mixture of a lower alcohol and a polyol such as glycol or glycerol.

The strong base may for example be sodium or potassium hydroxide, or even sodium amide. Their concentration may be from 0.05 to 1 M, preferably 0.1 to 0.3 M, for the electrolysis to proceed satisfactorily.

The phenol monomer is used at concentrations of at least 6 g/l of electrolyte, preferably 12 to 25 g/l.

It is also recommended to provide about 3 g of monomer per $dm^2$ of substrate to be coated.

The anode or conducting substrate to be coated by the polymer of the invention may in most cases consist of common metals such as iron, silver, nickel, chromium, copper, gold, platinum, etc., or alloys thereof.

Electrolysis is carried out in a bath (for example of steel) in a conventional manner at ambient temperature with an initial output voltage from the generator of the order of 10 volts and an initial current density of 0.1 to 1 $A/dm^2$. The polymer film is rapidly formed on the surface of the anode (or substrate) and a complete coating, generally obtained in 5 to 30 minutes, can be detected by the fact that the current becomes very weak.

After electrolysis the substrate coated with the polymer film is washed with water and then with alcohol to remove residual traces of base, phenol monomer, and any byproducts that have been formed.

The polymer films obtained according to the invention are homogeneous, continuous, uniform, thin (300 to 3500 Å depending on the polymer), insoluble in water and alcohols, very adherent, and hydrophilic depending on the reactive group they contain.

The following examples illustrate the invention.

EXAMPLE 1

Polymer of metahydroxybenzyl alcohol or poly(2-hydroxymethyl-1,4-phenylene oxide)

A solution of 0.62 g (0.1 M) of metahydroxybenzyl alcohol and 0.6 g of sodium hydroxide (0.3 M) in 50 $cm^3$ of methyl alcohol is electrolysed using a solid copper anode having a surface of 12 $cm^2$.

A potential difference $\Delta V = 0.94$ volts with respect to a saturated calomel electrode (SCE) is applied. The current density is initially $i_i = 2$ $mA/cm^2$ and falls to $i_f = 0.5$ $mA/cm^2$ after 40 minutes.

A film is obtained having a thickness of 2500 Å as measured with a Tolansky interference apparatus mounted on a Leitz metalloplan microscope.

EXAMPLE 2

Polymer of o-hydroxyphenylacetic acid or poly(2-carboxymethyl-1,4-phenylene oxide)

In the same manner as described in Example 1, a solution of 0.76 g (0.1 M) of salicyclic acid and 0.6 g of NaOH in 50 $cm^3$ of methyl alcohol is electrolysed using an iron mirror as anode (iron evaporated on a glass plate) and applying a voltage of $\Delta V = 0.85$ V/SCE $i_i = 3$ $mA/cm^2$; $i_f = 0.1$ $mA/cm^2$; $t = 25$ minutes A polymer film having a thickness of 1200 Å is obtained.

EXAMPLE 3

Polymer of 2-p-hydroxyphenylethylamine or poly(4-aminoethyl-1,2-phenylene oxide)

(a) In the same manner as described in Example 1, a methanolic solution (50 cm$^3$) of 0.68 g of 2-p-hydroxyphenylethylamine (Tyramine) and 0.6 g of NaOH is electrolysed using a solid copper anode having an area of 18 cm$^2$. $\Delta V=0.5$ V/SCE.

$i_i=1.55$ mA/cm$^2$; $i_f=0.06$ mA/cm$^2$; t=40 minutes

The film obtained has a thickness of 2500 Å.

(b) The above experiment is repeated, replacing the copper anode by an iron mirror having an area of 8.8 cm$^2$. $\Delta V=0.9$ SCE.

$i_i=3.8$ mA/cm$^2$; $i_f=0.1$ mA/cm$^2$; t=30 minutes

EXAMPLE 4

Polymer of N-o-hydroxybenzylaniline or poly(2-anilinomethyl-1,4-phenylene oxide)

(a) Electrolysis is carried out in the same manner as described in the previous examples but varying the potential difference $\Delta V$ from 0 to 1.3 V/SCE and using an iron mirror having an area of 9 cm$^2$.

$i_{max}=10$ mA; $i_f=0.8$ mA; t=8 minutes (sweep time).

Film thickness: 3000 Å

(b) The experiment is repeated using solid iron (7 cm$^2$) and a constant voltage.

$\Delta V=0.7$ V.; $i_i=2.2$ mA/cm$^2$; $i_f=0.03$ mA/cm$^2$ t=4 minutes

EXAMPLE 5

Polymer of 4-p-hydroxyphenyl-2-butanone (a) In the same way as described in Examples 1 to 3, 0.82 g (0.1 M) of 4-p-hydroxyphenyl-2-butanone is electrolysed using a solid iron anode of area 5 cm$^2$.

$i_i=36$ mA/cm$^2$; $i_{fo}=7$ mA/cm$^2$; t=5 minutes

Film thickness: 3500 A.

(b) Using a steel anode of 10 cm$^2$.

$i_i=40$ mA/cm$^2$; $i_f=22$ mA/cm$^2$; t=1 minute.

(c) Using a solid titanium anode of 16 cm$^2$.

$i_i=21$ mA/cm$^2$; $i_f=0.18$ mA/cm$^2$; t=5 minutes.

The following Table I shows, in addition to the previous examples, various substituted phenols that have been polymerised according to the invention. All the polymerisations were followed in situ by polaromicrotribometry (PMT), which enables physicochemical modifications to be detected on metal surfaces (see for example J. E. DUBOIS, P. C. LACAZE, R. COURTEL, C. C. HERMANN, D. MAUGIS, J. of Electrochem. Soc., 122, (1975) p 1454).

TABLE I

| Compound No. | Monomer | Thickness (Å) | oxydation potential $E_{ox}$/ECS (V) | | | |
|---|---|---|---|---|---|---|
| | | | Fe | Cu | Pt | Ni |
| 1 | OH, CHO (meta) | 400 | 0,57 | 0,29 | 0,35 | 0,41 |
| 2 | OH, CHO (para) | 300 | 0,47 | 0,33 | 0,34 | 0,41 |
| 3 | OH, CHO (ortho) | 300 | 0,53 | 0,37 | 0,41 | 0,45 |
| 4 | OH, COCH$_3$ (ortho) | 400 | 0,49 | 0,34 | 0,35 | 0,39 |
| 5 | OH, COCH$_3$ (meta) | 300 | 0,47 | 0,32 | 0,32 | 0,34 |
| 6 | OH, COCH$_3$ (para) | 300 | 0,47 | 0,33 | — | 0,41 |
| 7 | OH, COC$_2$H$_5$ | 700 | 0,57 | 0,36 | 0,54 | 0,36 |

TABLE I-continued

| Compound No. | Monomer | Thickness (Å) | oxydation potential $E_{ox}$/ECS (V) | | | |
|---|---|---|---|---|---|---|
| | | | Fe | Cu | Pt | Ni |
| 8 | OH–C₆H₄–COC₂H₅ 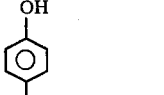 | 300 | 0,5 | 0,3 | 0,43 | 0,4 |
| 9 | OH, CO–C₆H₅ on benzene 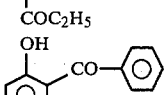 | 300 | 0,45 | 0,36 | 0,39 | |
| 10 | HO–C₆H₄–CO–C₆H₅ 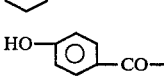 | 300 | 0,45 | 0,28 | — | 0,34 |
| 11 | OH–C₆H₄–CH₂–CH₂–CO–CH₃ 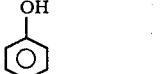 | 3500 | 0,46 | 0,23 | 0,18 | 0,22 |
| 12 | OH, CH₂OH on benzene 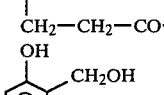 | 2500 | 0,42 | 0,22 | 0,20 | 0,22 |
| 13 | OH, CH₂OH (meta) 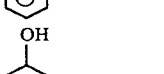 | 2500 | 0,51 | 0,51 | 0,25 | 0,28 |
| 14 | OH–C₆H₄–CH₂OH 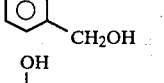 | 2500 | 0,46 | 0,24 | 0,16 | 0,31 |
| 15 | OH–C₆H₄–CH₂CH₂NH₂ 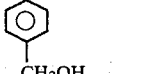 | 2500 | 0,32 | | 0,18 | 0,37 |
| 16 | OH, CH₂NH–C₆H₅ on benzene 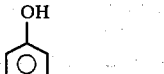 | 3000 | 0,46 | | 0,13 | |
| 17 | OH, CH₂COOH on benzene 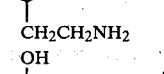 | 1200 | 0,49 | 0,18 | 0,12 | |
| 18 | OH, CH₂COOH (meta) 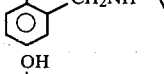 | 1500 | 0,52 | 0,27 | 0,18 | 0,55 |
| 19 | OH–C₆H₄–CH₂COOH 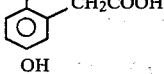 | 1150 | 0,49 | 0,27 | 0,15 | 0,56 |

The polymer films were treated with conventional chemical agents to verify the presence and reactivity of the functional chemical groups. The polymers containing the carbonyl group were treated with an ethanolic solution of 1% of 2,4-dinitrophenylhydrazine (2,4 DNPH) and 2% of concentrated HCl; the electrodes were soaked for 5 minutes in this solution at the boiling point and then washed in ethanol by ultrasonic agitation. The polymers containing the hydroxy or amino group were treated with acetyl chloride.

The polymer films of the invention as well as the films treated with the chemical agents were identified by means of multiple reflection IR spectroscopy and/or by ESCA (Electron Spectroscopy for chemical analysis).

The following Table II shows the characteristic peaks of the chemical groups for the polymers whose IR spectra exhibit a good resolution, while the results obtained by ESCA are given in Table III for the other groups.

In all the IR spectra obtained, the band corresponding to the OH phenolic group is completely absent; on the other hand, the peak characterising the polyhydroxide group appears at about 1200 cm$^{-1}$. The presence of very intense C=O absorption bands, corresponding either to the aldehyde (1700 cm$^{-1}$) or ketone (1680

$cm^{-1}$) group, proves that these groups remain unattached during the electrolysis.

TABLE II

| | (I.R.) | | | |
|---|---|---|---|---|
| | Before treatment | | After treatment with 2,4-DNPH | |
| Polymers of: | C=O $(cm^{-1})$ | C—O—C $(cm^{-1})$ | $r = \dfrac{I(C=O)final}{I(C=O)initial}$ | C=N $(cm^{-1})$ |
| m-hydroxybenzaldehyde | 1700 | 1240, 1150, 1050 | 0,38 | 1610 |
| p-hydroxybenzaldehyde | 1680 | 1210, 1150 | | |
| o-hydroxypropiophenone | 1680 | 1270, 1155, 1120, 1070 | 0,88 | 1610 |
| (p-hydroxyphenyl)-4 butanone-2 | 1700 | 1210, 1160 | 0,69 | 1615 |
| o-hydroxyacetophenone | 1680 | 1280, 1210, 1070 (w) (i) | | |
| m-hydroxyacetophenone | 1670 | 1265, 1190 (i) (w) | | |
| p-hydroxyacetophenone | 1670 | 1260, 1210, 1065, (w) (w) 1015 | | |
| o-hydroxybenzophenone | 1660 | 1280, 1230, 1140, (w) (i) 1015 | | | r = rapport des intensites d'absorption de C=O apres et avant traitment avec 2,4-DNPH
r = ratio of absorption intensisites of C=O after and before treatment with 2,4-DNPH
w = faible w = weak
i = intense i = intense ESCA analysis of the anodes thus confirms the presence of the polymers on their surface. The $C_{1s}$ spectra indicate the presence of distinct chemical groups via the values of typical bond energies. The same results are obtained for the ortho, meta or para derivatives.

TABLE III

| | (ESCA) | | | |
|---|---|---|---|---|
| | Carbon Spectrum | | Spectra of N or O | |
| Polymer of | bond | energy (eV) | bond | energy (eV) |
| Aldehydes and | C—C | 285 | | |
| ketones | C—O—C | 286 | | |
| (Nos. 1 to 11) | C=O | 288 | | |
| Hydroxyphenyl- | C—C | 285 | | |
| benzyl alcohols | C—O—C | 286 | | |
| | —COO—R | 289.2 (after treatment with CH$_3$COCl) | | |
| p-hydroxyphenyl- | C—C | 285 | N—H | 399.7 |
| ethylamine | C—O—C | 286.6 | | |
| N-(o-hydroxy- | C—C | 285 | N—H | 399.3 |
| benzyl)-aniline | C—O—C | 286.2 | | |
| Hydroxyphenyl- | C—C | 285 | C—O—C | 533.1 |
| acetic acids | C—O—C | 286.4 | —COO$^\theta$ | 532 |
| | —COO$^\theta$ | 288.6 | | |

On account of the presence of a reactive chemical group over the whole surface, the polymer films of the invention can be used to graft various materials reacting with these groups.

It is thus possible to fix enzymes or even cause other compounds containing reactive groups, for example acid chlorides or anhydrides, to react with the polymer films containing a hydroxy or amine group (thus enabling a polyester or polyamide surface respectively to be obtained). This property enables the polymer films of the invention to be used as intermediate layers for bonding resins, lacquers, varnishes and paints in particular to metals to which they adhere very poorly.

We claim:

1. A polyphenylene oxide film obtained by anodically oxidizing a monomer of the formula

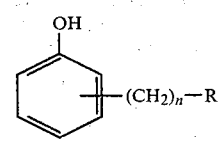

wherein
R is $C_{1-7}$acyl, hydroxy, carboxy, alkoxycarbonyl, amino, alkylamino, or phenylamino; and
n is an integer or where R is acyl, 0 or an integer.

2. A polyphenylene oxide film according to claim 1 in which —(CH$_2$)$_n$—R denotes a formyl, acetyl, propionyl, benzoyl, 3-hydroxybutyl, hydroxymethyl, carboxymethyl, aminoethyl or anilinomethyl group.

3. Polymer film obtained from o-, m- or p-hydroxybenzaldehyde.

4. Polymer film obtained from o-, m- or p-hydroxyacetophenone.

5. Polymer film obtained from o- or p-hydroxypropiophenone.

6. Polymer film obtained from o- or p-hydroxybenzophenone.

7. Polymer film obtained from 4-parahydroxyphenyl-2-butanone.

8. Polymer film obtained from o-, m- or p-hydroxybenzyl alcohol.

9. Polymer film obtained from 2-p-hydroxyphenylethylamine.

10. Polymer film obtained from N-o-hydroxybenzylaniline.

11. Polymer film obtained from o-, m- or p-hydroxyphenylacetic acid.

12. A polyphenylene oxide film obtained by anodically oxidizing a monomer of the formula:

wherein
R is amino, lower alkylamino, or phenylamino; and n is an integer.

13. A polyphenylene oxide film of claim 12 wherein n is 1 to 4.

14. A method for the electrolytic preparation of a polyphenylene oxide film which comprises anodically oxidizing in an alcoholic and strongly basic electrolytic bath a monomer of the formula:

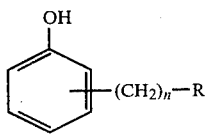

wherein
R is $C_{1-7}$ acyl, hydroxy, carboxy, alkoxycarbonyl, amino, alkylamino, or phenylamino; and
n is an integer or where R is acyl, 0 or an integer.

15. A method of claim 14 wherein R is amino, lower alkylamino or phenylamino; and n is an integer.

16. A method of claim 15 wherein n is 1 to 4.

17. A method of claim 14 wherein —$(CH_2)_n$—R denotes a formyl, acetyl, propionyl, benzoyl, 3-hydroxybutyl, hydroxymethyl, carboxymethyl, aminoethyl or anilinomethyl group.

18. A method of claim 14 wherein said monomer is o-, m- or p-hydroxybenzaldehyde.

19. A method of claim 14 wherein said monomer is o-, m- or p-hydroxyacetophenone.

20. A method of claim 14 wherein said monomer is o- or p-hydroxypropiophenone.

21. A method of claim 14 wherein said monomer is o- or p-hydroxybenzophenone.

22. A method of claim 14 wherein said monomer is 4-parahydroxyphenyl-2-butanone.

23. A method of claim 14 wherein said monomer is o-, m- or p-hydroxybenzyl alcohol.

24. A process of claim 14 wherein said monomer is 2-p-hydroxyphenylethylamine.

25. A method of claim 14 wherein said monomer is N-o-hydroxybenzylaniline.

26. A method of claim 14 wherein said monomer is o-, m- or p-hydroxyphenylacetic acid.

27. In a bonded resin, the improvement which comprises including between at least two layers of said bonded resin a polyphenylene oxide film according to claim 2, 1, 12 or 13, whereby the strength of the bond is enhanced.

28. In a bonded lacquer, varnish or paint which is bonded to a metallic or metallized surface, the improvement which comprises incorporating between said lacquer, varnish or paint and said surface a polyphenylene oxide film according to claim 2, 1, 12 or 13.

29. A polyphenylene oxide film of claim 2, wherein said film has a thickness of from about 300 Å to about 3500 Å.

30. A polyphenylene oxide film of claim 1, wherein said film has a thickness of from about 300 Å to about 3500 Å.

31. A polyphenylene oxide film obtained by anodically oxidizing a monomer of the formula:

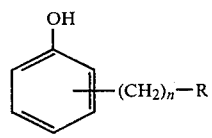

wherein
R is phenylamino; and
n is an integer.

32. A polyphenylene oxide film of claim 31 wherein n is 1 to 4.

* * * * *